A. J. ELLISON.
SPIRIT LEVEL.
APPLICATION FILED DEC. 10, 1917.

1,298,024.

Patented Mar. 25, 1919.

Inventor
August J. Ellison
By William C. Linton
Attorney

UNITED STATES PATENT OFFICE.

AUGUST J. ELLISON, OF MONTREAL, QUEBEC, CANADA, ASSIGNOR OF ONE-HALF TO ERNEST HENRY DAY, OF MONTREAL, QUEBEC, CANADA.

SPIRIT-LEVEL.

1,298,024.     Specification of Letters Patent.     Patented Mar. 25, 1919.

Application filed December 10, 1917. Serial No. 206,367.

*To all whom it may concern:*

Be it known that I, AUGUST J. ELLISON, a subject of the King of Great Britain, residing at Montreal, Province of Quebec, Canada, have invented certain new and useful Improvements in Spirit-Levels; and I do hereby declare that the following is a full, clear, and exact description of the invention, such as will enable others skilled in the art to which it appertains to make and use the same.

The present invention relates to leveling instruments and more particularly to a spirit level to be used in connection with such instruments.

An object of the present invention is to provide a spirit level which may be easily and readily applied to or detached from a level-stock, so that bricklayers, masons, or other artisans who use such leveling instruments may carry the spirit level to and from their work and apply the same to any suitable level-stock.

With the above and other objects in view which will hereinafter appear as the description continues, the invention consists of the novel features of construction, combination and formation of parts as will be hereinafter more fully described and particularly pointed out in the appended claims.

In the accompanying drawings has been shown a simple and preferred form of the invention, it being, however, understood that no limitation is neccessarily made to the precise structural details herein exhibited, but the right is hereby reserved to any changes, alterations or modifications to which recourse may be had that come within the scope of the claims without departing from the spirit of the invention or sacrificing the efficiency of the same.

In the accompanyinig drawings.

Referring now more particularly to the accompanying drawings wherein like and corresponding parts are designated by similar reference characters throughout the several views.

Figure 1:
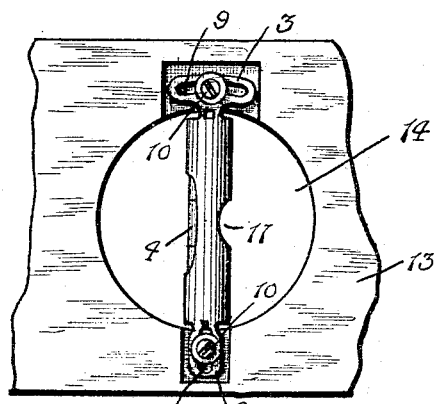
Figure 1 is a plan view of the level as applied within the frame of the leveling instrument.

The spirit level embodying the present invention comprises a metallic tube 1 provided with the projecting flanges 2 and 3 respectively. Arranged within this tube 1 is a level glass or bubble tube 4 which is retained in place by means of the plaster of Paris 5, or other packing material. The opposite ends of this tube are open and adapted to rest within these opposite ends of the tube are the disks 6 and one face of each of these disks rests against the plaster of Paris 5, whereas the lugs 7 carried by the body portion of the tube 1 are bent up so as to retain these disks in place and thereby close the opposite ends of the tube. The flange 2 is provided with a longitudinally extending elongated slot 8 whereas the flange 3 is provided with a transverse arcuate slot 9. Adapted to project through the slots 8 and 9 are the set screws 10 which are for retaining the spirit levels upon the stock of the leveling instrument. Arranged on each side of each of these flanges are the rubber disks 11 which act as cushioning members and the washers 12 are provided.

From the foregoing it is obvious that the spirit level may be easily and readily applied to or detached from any level stock and all that is necessary for the artisan to carry with him when traveling from one position to another is to take the spirit level with him without the trouble of carrying a level-stock, which is very unhandy to carry and takes up considerable room. When the artisan arrives at his work he can then take an ordinary strip of wood which can be turned into the level stock and the level then applied thereto. Also in the case where leveling instruments of various lengths are required the spirit level or tube can be readily applied to leveling instruments of various lengths.

Figure 3:
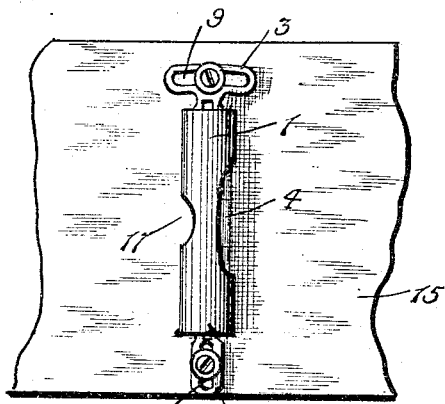
Fig. 3 is a plan view of the level as secured to one face of the leveling instrument.
Figure 2:
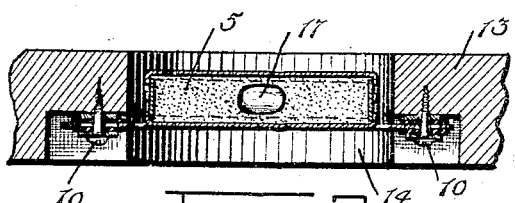
Fig. 2 is a cross section through the same.
Figure 4:
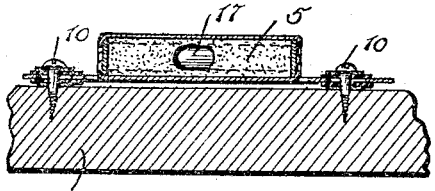
Fig. 4 is a cross section through the same.
Figure 5:
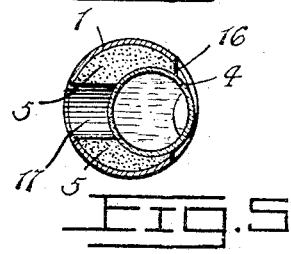
Fig. 5 is a cross section through the spirit level.
Figure 6:
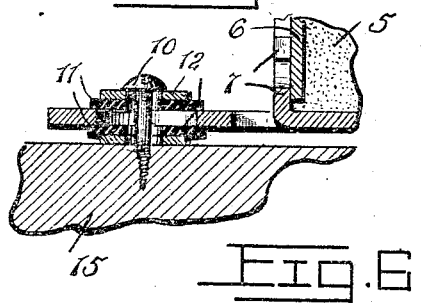
Fig. 6 is a detail connection between the spirit level and the stock of the instrument.

In Figs. 1 and 2 of the drawings, I have illustrated a leveling instrument comprising a level stock 13 having the usual opening 14 and it is obvious that the spirit level may be supported within this opening and by providing the slots 8 and 9 the device may be adjusted to the desired position. In Figs. 3 and 4 I have illustrated the instrument as applied to ordinary strips of wood 15 showing that the instrument may be readily applied to any face of the level stock.

The tube 1 is cut away as at 16 so that the bubble tube will be exposed to view and an opening 17 is provided within the tube forming a light opening whereby when the level is applied to a strip as shown in Fig. 3 light will be admitted through this opening 17 thereby better disclosing the bubble within the bubble tube. By also providing the rubber disks 11 should the leveling instrument be dropped these disks will act as cushioning devices so as to prevent the breaking of the tube and they will also prevent the flanges from moving in relation to their fixed connections to the stock. These flanges 2 and 3 may also have milled faces adapted to engage with the washers 12 so as to prevent the level from slipping or in any manner moving when once applied to the instrument.

Having thus fully described my invention, what I claim as new and desire to secure by Letters Patent is:

1. A spirit level comprising an open-ended tube, a bubble glass arranged within said tube, a filling within said tube for retaining said bubble glass in place, disks for closing the opposite ends of said tube, said tube and filling having coincident light openings therein, flanges projecting from and formed integral with said tube and fastening members adapted to be connected to said flanges.

2. The combination in a leveling instrument, of an open-ended tube, a bubble glass arranged within said tube, a filling within said tube for holding said bubble glass in place, disks arranged within the opposite ends of said tube, lug projections carried by said tube for holding the disks in place, flanges projecting from the opposite ends of said tube, one of said flanges having an arcuate slot therein, the other of said flanges having a longitudinally extending slot therein, fastening members adapted to extend through said slots for detachably connecting said tube with the leveling instrument, cushioning devices arranged between said flanges and said fastening members, and said tube and filling having coincident light openings therein substantially as and for the purpose specified.

In witness whereof I have hereunto set my hand.

AUGUST J. ELLISON

Copies of this patent may be obtained for five cents each, by addressing the "Commissioner of Patents, Washington, D. C."